United States Patent [19]
Walter

[11] Patent Number: 5,286,756
[45] Date of Patent: Feb. 15, 1994

[54] EXPANDABLE STYRENE POLYMERS HAVING A FIRST COATING CONTAINING BISAMIDES

[75] Inventor: Manfred Walter, Speyer, Fed. Rep. of Germany

[73] Assignee: BASF Aktiengesellschaft, Ludwigshafen, Fed. Rep. of Germany

[21] Appl. No.: 910,372

[22] Filed: Jul. 8, 1992

[30] Foreign Application Priority Data

Jul. 13, 1991 [DE] Fed. Rep. of Germany ....... 4123252

[51] Int. Cl.$^5$ .............................................. C08J 9/224
[52] U.S. Cl. ...................................... 521/57; 427/222; 521/56; 521/60
[58] Field of Search ....................... 521/57, 60, 56; 427/222

[56] References Cited

U.S. PATENT DOCUMENTS

| 3,389,097 | 6/1968 | Ingram et al. | 521/60 |
| 3,595,464 | 7/1971 | Harrison . | |
| 3,960,787 | 6/1976 | Isukamoto et al. | 521/60 |

FOREIGN PATENT DOCUMENTS

| 0114503 | 8/1984 | European Pat. Off. . |
| 1769096 | 9/1971 | Fed. Rep. of Germany . |
| 1769475 | 9/1971 | Fed. Rep. of Germany . |
| 61157538A | 8/1972 | Japan . |
| 56-106930 | 8/1981 | Japan . |
| 57-008104 | 1/1982 | Japan . |

Primary Examiner—Morton Foelak
Attorney, Agent, or Firm—Keil & Weinkauf

[57] ABSTRACT

The invention relates to an expandable styrene polymer, comprising
(a) a styrene polymer,
(b) from 1 to 10% by weight, based on (a), of a blowing agent or blowing agent mixture,
(c) from 0.02 to 0.25% by weight, based on (a), of a first coating containing a coating composition comprising
  ($c_1$) a bisamide made from a $C_2$–$C_8$-alkylenediamine and an aliphatic $C_6$–$C_{20}$-carboxylic acid and
  ($c_2$) a conventional antistatic,
in a ($c_1$):($C_2$) weight ratio of from 1 to 50,
and, if desired, further coating compositions or coating composition mixtures and conventional additives in effective amounts, and to a process for the preparation of screen fractions of bead-form, expandable styrene polymers prepared by suspension polymerization.

5 Claims, No Drawings

EXPANDABLE STYRENE POLYMERS HAVING A FIRST COATING CONTAINING BISAMIDES

The present invention relates to an expandable styrene polymer having a first coating containing bisamides. In particular, the present invention relates to expandable styrene polymers whose surface contains, as a first coating, a coating composition comprising at least one bisamide and at least one conventional antistatic. The present invention furthermore relates to a process for the preparation of screen fractions of bead-form, expandable styrene polymers prepared by suspension polymerization.

The large-scale industrial preparation of expandable styrene polymers (EPS) by suspension polymerization always gives a mixture of beads of various diameters. A certain bead size distribution is attained. The mean bead size and, to a certain extent, also the distribution breadth can be controlled by suitable measures. However, the phenomenon of bead-size distribution cannot be avoided entirely.

The EPS products employed in industry are generally screen fractions comprising bead-size distributions of this type obtained by screening.

For moldings, screen fractions containing relatively small mean bead sizes are normally used, for example screen fractions of from 0.4 to 0.7 mm or from 0.7 to 1.0 mm. Screen fractions having larger bead sizes are employed for the production of foam blocks, for example screen fractions of from 1.0 to 1.4 mm or from 1.4 to 2.0 mm. In addition, other screen fractions are available for specific applications, e.g. for fillers in conductive plasters, for the production of porous bricks, etc.

When the suspension polymerization is complete, a mixture of EPS beads of various sizes and the aqueous suspension medium, also known as serum, is obtained. The aqueous suspension medium must be separated from the beads. This is accomplished in equipment suitable for this purpose, e.g. centrifugal filters, which are produced, for example, by Siebtechnik, D-4330 Mülheim/Ruhr. The beads obtained are generally then washed with water in order to remove any remaining residues of the suspension stabilizer system. To this end, the beads are slurried in approximately the same amount by weight of water, preferably of drinking water quality. The washing water must then likewise be removed again. This can be carried out, for example, using the same equipment as already used for removing the serum.

After removal of the washing water, the mixture of the beads of different sizes is obtained, but these still carry a certain residual moisture on their surfaces. Before the beads are separated into the corresponding screen fractions by screening, this surface water must be removed since the beads otherwise adhere to one another and make effective screening impossible or extremely difficult.

The removal of the water adhering to the bead surfaces is generally carried out in pneumatic-conveyor driers, in which the beads are freed from surface water in a stream of warm air. During drying, entry temperatures of from 30° to 65° C. are generally used. Temperatures which are too low result in inadequate drying; on the other hand, temperatures must not be too high since otherwise there would be a risk of foaming of the EPS beads commencing.

After the surface water has been removed (flash drying), the bead mixture could in principle be fed to a suitable screening device. However, it has been shown in practice that a screen aid in the form of first surface coating of the beads is necessary for the screening of EPS beads. This screen aid has to fulfil two tasks; firstly, it must prevent the beads becoming electrostatically charged and thus making screening more difficult or impossible, and secondly it must protect the beads against mechanical damage to their surfaces as a consequence of mechanical loads due to the movement over the screen mesh and during transport from and to the screens. Such mechanical damage results in problems during conversion of EPS beads to foams, in particular in the beads baking together during prefoaming.

In accordance with its function, the screen aid generally comprises two components. The first is an antistatic, which prevents electrostatic charging, and the second is a lubricant, which provides protection against mechanical damage to the surface.

The component for protection against mechanical damage to the surface has hitherto generally been zinc stearate.

However, the use of heavy-metal salts is problematic for ecological reasons. It is therefore desired to replace such salts by suitable substances which do not contain heavy metals.

After screening, the first coating, also known as a screen aid, is generally covered by further coatings which provide the products with the processing or applicational properties required. It is desirable here that the first coating improves the adhesion of the coating composition applied in the further coating steps.

DE-A 17 69 096 describes finely divided, expandable styrene polymers which contain at last 50% by weight of copolymerized styrene and have been coated by a dusting agent and a silicone of the composition $R_2SiO$. Dusting agents mentioned are N,N'-distearoylethylenedismine and zinc stearate.

DE-A 17 69 475 describes finely divided, expandable styrene polymers which have been coated with from 0.005 to 0.5% by weight, based on the weight of the styrene polymers, of a polytrifluorochloroethylene. The flow and processing properties of these finely divided, expandable styrene polymers are said to be improved if the coating, in addition to polytrifluorochloroethylene, contains from 0.005 to 0.5% by weight (based on the styrene polymer) of a dusting agent, for example a compound of the formula $R'—NH—(CH_2)_n—NH—R^2$ where n is 2, 3 or 4 and $R^1$ and $R_2$ are fatty acid radicals having 12 to 18 carbon atoms. The substances known per se as dusting agents for finely divided, expandable styrene polymers are said to additionally improve the flow properties of the styrene polymers in the unfoamed state and to reduce agglomeration during prefoaming. The substances of the general formula, such as N,N'-bistearoylethylenediamine, are in addition said to impair the welding of the prefoamed particles during expansion to give moldings less than other conventional dusting agents, such as zinc stearate, and additionally to improve the flow properties of the freshly foamed particles.

JP-A-61/157,538 discloses the coating of expandable polystyrene with a mixture of ethylenebis(stearate)amide and 12-hydroxystearyl triglyceride.

It is an object of the present invention to indicate a coating composition, in particular for a first coating before screening, which contains no heavy metals and, compared with known coating compositions, generally containing zinc stearate, increases the protection against mechanical damage to the surface and improves the adhesion of the coating composition mixtures to be applied to the individual screen fractions after screening.

We have found that this object is achieved by using coating compositions comprising a certain bisamide and an antistatic for the first coating.

The present invention accordingly provides an expandable styrene polymer which comprises
(a) a styrene polymer,
(b) from 1 to 10% by weight, based on (a), of a blowing agent or blowing agent mixture,
(c) from 0.02 to 0.25% by weight, based on (a), of a first coating containing a coating composition comprising
   ($c_1$) a bisamide made from a $C_2$–$C_8$-alkylenediamine and an aliphatic $C_6$–$C_{20}$-carboxylic acid and
   ($c_2$) a conventional antistatic, in a ($c_1$):($c_2$) weight ratio of from 1 to 50, and, if desired, further coating compositions or coating composition mixtures and conventional additives in effective amounts.

The present invention also provides a process for the preparation of screen fractions of bead-form, expandable styrene polymers prepared by suspension polymerization, which comprises intimately mixing the beads, which are still moist at the surface, with from 0.02 to 0.25% by weight, based on the dry styrene polymer, of a coating composition comprising
   ($c_1$) a bisamide made from a $C_2$–$C_8$-alkylenediamine and an aliphatic $C_6$–$C_{20}$-carboxylic-acid and
   ($c_2$) a conventional antistatic
in a ($c_1$):($c_2$) weight ratio of from 1 to 50, subsequently removing the surface water by flash drying at a temperature of from 30° to 65° C. for from 1 to 10 seconds, then separating the dry, coated beads into screen fractions, and, if desired, subsequently applying further amounts of coating composition or coating composition mixture onto the individual fractions.

Component (a) in the novel product is polystyrene and/or a styrene polymer containing at least 50% by weight, preferably at least 80% by weight, of copolymerized styrene. Examples of suitable comonomers are α-methylstyrene, ring-halogenated styrenes, ring-alkylated styrenes, acrylonitrile, esters of acrylic or methacrylic acid of alcohols having 1 to 8 carbon atoms, N-vinylcarbazole, maleic acid and maleic anhydride. The polystyrene may advantageously contain a small amount of a copolymerized chain-branching agent, i.e. a compound containing more than one, preferably two, double bonds, such as divinylbenzene, butadiene or butanediol diacrylate. The branching agent is generally used in an amount of from 0.005 to 0.05 mol %, based on styrene.

Styrene polymers having molecular weights and molecular weight distributions as described in EP-B 106 129 and DE-A 39 21 148 are advantageously used.

It is also possible to use mixtures of different styrene polymers, as described, for example, in DE-A 39 01 329, 39 08 238, 39 36 596, 39 31 862 and 39 16 602.

The expandable styrene polymers are generally in the form of particles, in particular in the form of beads, advantageously having a mean diameter of from 0.05 to 6 mm, in particular from 0.3 to 3 Mm. They are prepared in a manner known per se by suspension polymerization.

The principles of suspension polymerization are described in Encyclopedia of Polymer Science and Technology, Volume 13, pages 552–570, John Wiley & Sons, Inc., New York, 1970. To this end, styrene, if desired with addition of further comonomers, is polymerized in aqueous suspension in the presence of a conventional suspension stabilizer and in the presence of free-radical forming catalysts. The polymerization is advantageously carried out using a regulator and/or a chain-branching agent, for example in an amount of from 0.005 to 0.05 mol %. The blowing agent and any additives can be introduced at the beginning of the polymerization or added to the batch during or after the polymerization.

The expandable styrene polymer contains from 1 to 10% by weight of a blowing agent or blowing agent mixture (b), for example from 1 to 10% by weight, preferably from 3 to 8% by weight, of a $C_3$- to $C_6$-hydrocarbon, such as propane, butane, isobutane, n-pentane, i-pentane, neopentane and/or hexane. Preference is given to a commercially available pentane mixture.

Component (c), which is essential to the invention, is the coating composition comprising
   ($c_1$) a bisamide made from a $C_2$–$C_8$-alkylenediamine and an aliphatic $C_6$–$C_{20}$-carboxylic acid and
   ($c_2$) a conventional antistatic and is in the form of a first coating on the expandable styrene polymer.

The bisamide ($c_1$) according to the invention conforms to the formula I

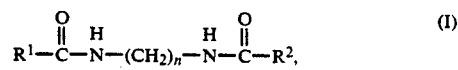

where n is from 1 to 6 and $R^1$ and $R^2$ are $C_6$–$C_{21}$-alkenyl or alkyl.

Preference is given to bisamides derived from 1,2-ethylenediamine (n=2).

Particular preference is given to the bisstearates derived from 1,2-ethylenediamine and aliphatic $C_{16}$–$C_{20}$-carboxylic acids and melting above 130° C. Very particular preference is given to N,N'-bisethylenestearamide.

The bisamide must be employed in finely divided form. The particle diameter is generally predominantly less than 0.1 mm. At least 80% by weight of the particles preferably have a diameter of less than 0.07 mm, and at least 90% by weight of the particles particularly preferably have a diameter of less than 0.04 mm.

The particle sizes can be determined by jet screen analysis.

Suitable bisamides are marketed, for example, by Glyco Chemicals Inc. under the name Acrawax®, powered or atomized, or by Comiel under the name Syntewax®.

Antistatics ($c_2$) which can be used are the substances conventional in industry. Examples are N,N-bis(2-hydroxyethyl)-$C_{12}$–$C_{18}$-alkylamines, fatty acid diethanolamides, choline ester chlorides of fatty acids, $C_{12}$–$C_{20}$-alkyl sulfonates, ammonium salts, etc.

Suitable ammonium salts contain 1 to 3 hydroxyl-containing organic radicals on the nitrogen in addition to alkyl groups.

Examples of suitable quaternary ammonium salts are those which contain 1 to 3, preferably 2, identical or different alkyl radicals having 1 to 12, preferably 1 to 10, carbon atoms, and 1 to 3, preferably 2, identical or different hydroxyalkyl or hydroxyalkylpolyoxyalkylene radicals bonded to the nitrogen cation, with any desired anion, such as chloride, bromide, acetate, methylsulfate or p-toluenesulfonate.

The hydroxyl- and hydroxyalkyl-polyoxyalkylene radicals are those formed on oxyalkylation of a nitrogen-bonded hydrogen atom and derived from $C_1$- to $C_{10}$-oxyalkylene radicals, in particular oxyethylene and oxypropylene radicals.

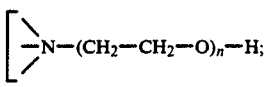

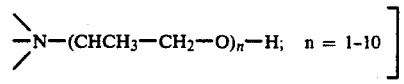   $n = 1-10$

Preference is given to bis(2-hydroxyethyl)octylmethylammonium p-toluenesulfonate, bis(2-hydroxypropyl)dioctylammonium chloride, tris(2-hydroxyethyl)methylammonium acetate and the ammonium salt obtained by reacting ammonia with 15 mol of ethylene oxide and subsequently quaternizing the product with dimethylsulfate.

The coating composition (c) contains components ($c_1$) and ($c_2$) in a weight ratio of from 1 to 50, preferably from 1 to 20, particularly preferably from 3 to 12. It is employed in an amount, based on the styrene polymer (a), of from 0.02 to 0.25% by weight, preferably from 0.03 to 0.2% by weight, particularly preferably from 0.04 to 0.15% by weight.

The coating composition (c) is applied to the polymer beads containing blowing agent and generally still moist before the production of screen fractions by screening. A first coating is thereby applied to the as yet uncoated polymer beads.

In addition, it may be advantageous to additionally apply the coating composition (c) onto the surface of the expandable styrene polymers after screening.

The screening can be carried out in suitable screening devices, produced, for example, by Engelsmann, D-6700 Ludwigshafen, Allgeier, D-7336 Uhingen or Zentrifugiertechnik GmbH, D-4220 Dinslaken.

After screening to give screen fractions suitable for marketable products, the individual screen fractions are surface-coated, in equipment suitable for this purpose, with further substances or mixtures of substances in order to provide the products with the processing or applicational properties required. These properties are, in particular, short demolding times during foam molding, low adhesion during prefoaming, low water absorption during foam molding, etc.

Coating substances of this type are the mono-, di- and tristearates of glycerol, tristearol citrates, sorbitan fatty acid esters, finely divided silica, alkaline earth metal stearates, etc. For specific applications, antistatics, flameproofing agents, dyes, lubricants and fillers, etc, are furthermore used in effective amounts.

In order to ensure good, uniform adhesion of the coating to the polymer beads, it is possible to use a conventional adhesion promoter. Examples of suitable adhesion promoters are aqueous dispersions of polyvinyl acetate, polyvinyl propionate, polyethyl acrylate, polybutyl acrylate and styrene-butadiene copolymers.

The expandable styrene polymers according to the invention have numerous advantages.

The bead surfaces are very well protected during the screening operation, so that no mechanical damage can take place and the adhesion values during prefoaming of the EPS beads remain low. No loss of blowing agent takes place during pneumatic-conveyor drying, and the adhesion of the coating composition mixtures applied to the individual screen fractions after screening is improved.

For the production of foams, the expandable styrene polymers are expanded in a known manner by heating to above their softening point, for example using hot air or preferably using steam. The foam particles obtained can, after cooling and possibly after interim storage, can be expanded further by reheating. The particles can then, if desired after cooling and interim storage, be welded in a known manner in molds which do not close in a gas-tight manner to give moldings.

The foams obtained generally have a density of from about 0.01 to 0.1 g/cm³. They are used, inter alia, as thermal and sound insulators, as cushioning materials and for shock-absorbent packaging.

In the Examples, parts are by weight.

EXAMPLES

Suspension Polymerization

A mixture of 150 parts of water, 0.1 part of sodium pyrophosphate, 100 parts of styrene, 0.15 part of benzoyl peroxide and 0.25 part of tert-butyl perbenzoate was heated at 90° C. for 2 hours with stirring in a pressure-tight stirrer reactor. After 1 hour at 90° C., 4 parts of a 10% strength aqueous solution of polyvinylpyrrolidone were added as suspension stabilizer. The mixture was then stirred at 90° C. for a further 2 hours, subsequently at 100° C. for 2 hours and finally at 120° C. for 2 hours. After 5 hours from commencement of the polymerization, 7 parts of pentane were added.

The advantages of the invention are illustrated with reference to the Example and the Comparative Example, in each of which the coating was carried out using the styrene polymer obtained as above.

EXAMPLE

A bead polymerization batch of expandable polystyrene (EPS) was removed from the pressure-tight reactor after completion of the polymerization and after cooling to room temperature. The EPS beads having a diameter of >0.2 mm were separated from the aqueous serum by means of a centrifugal filter. They were subsequently slurried in the same amount by weight of water (drinking water quality) and reseparated from the water.

The surface-moist EPS beads were subsequently introduced by means of a conveying screw into a pneumatic-conveyor drier, where the surface moisture was removed by warmed air at 60° C. In the conveying screw to the drier, N,N'-bisethylenestearamide was metered into the stream of moist EPS beads via a metering belt balance and a small conveying screw, and an aqueous solution of sodium ($C_{14}$–$C_{17}$)alkylsulfonate was metered in via a metering pump. The flow rates were adjusted so that 0.06% by weight of N,N'-bisethylenestearamide and 0.006% by weight of alkylsulfonate were present, in each case based on the total amount of dry EPS beads.

After leaving the drier, the EPS beads were divided into the following screen fractions in an Engelsmann screen:

<0.4 mm 0.4 to 0.7 mm (fraction 1)
0.7 to 1.0 mm (fraction 2)
1.0 to 1.3 mm (fraction 3)
1.3 to 1.8 mm (fraction 4)
>1.8 mm.

The beads having diameters of <0.4 mm and >1.8 mm were discarded. The screen fractions corresponding to diameters of from 0.4 to 0.7 mm and from 0.7 to 1.0 mm were then surface-coated with 0.4% by weight of a mixture of 95% by weight of glycerol monostearate and 5% by weight of finely divided silica in a Lödige paddle mixer. The screen fractions from 1.0 to 1.3 mm and from 1.3 to 1.8 mm were surface-coated with 0.3% by weight of the same mixture in the same apparatus.

After the products had been stored for 72 hours in sealed drums, 3 tests were carried out.
1) Determination of the adhesion during prefoaming in a Rauscher C 69 continuous prefoamer,
2) determination of the adhesion during prefoaming in a Haendle 100 batch prefoamer and
3) deterioration of the proportion of the coating which does not adhere to the beads by air classification.

In order to determine the adhesion, the bends obtained after prefoaming and drying were screened through a screen having a mesh width of 8 mm. The agglomerated (baked) proportion was separated off and weighed. Tables 1 and 2 show the proportions of agglomerated material in % by weight, based on the total weight of prefoamed beads, for fractions 1 to 4.

TABLE 1

Continuous prefoamer: Rauscher C 69

| Fraction | Example | Comparative example |
|---|---|---|
| 1 | 3.7 | 4.1 |
| 2 | 2.8 | 2.7 |
| 3 | 0.4 | 0.6 |
| 4 | 0.15 | 0.2 |

TABLE 2

Batch prefoamer: Haendle 100

| Fraction | Example | Comparative example |
|---|---|---|
| 1 | 4.8 | 5.2 |
| 2 | 3.1 | 3.3 |
| 3 | 0.7 | 0.6 |
| 4 | 0.2 | 0.3 |

In order to determine the proportion of coating compositions which does not adhere firmly to the bead surfaces, 600 g of the EPS beads coated as described above were introduced into a glass cylinder sealed at the bottom by means of a glass frit. A 90 m³/h stream of air was passed through the bed of beads from below for 10 minutes at room temperature. By means of this stream of air, the coating component which did not adhere firmly to the bead surfaces was blown out of the cylinder.

The coating was in each case twice washed off 100 g of beads using isopropanol, both before and after the blowing-out operation. The washing water from the two washing operations were in each case combined and evaporated to dryness in a rotatory evaporator. The residues were weighed. The weight difference between the coatings before and after the blowing-out operation gives the proportion of coating composition which does not adhere firmly to the bead surfaces.

Table 3 shows the amount of coating composition in % by weight, based on the weight of the dry beads, before and after blowing out for the Example and for the Comparative Example. The loss of coating composition is shown in Table 3 in absolute terms (in % by weight) and in relative terms (in %), based on the amount of coating composition before the blowing out.

COMPARATIVE EXAMPLE

The procedure was as in the Example, but 0.06% by weight of zinc stearate instead of N,N'-bisethylenestearamide was metered into the conveying screw to the flash drier.

The experimental results are shown in Tables 1 to 3. The results shown in the Tables confirm that the use of N,N'-bisethylenestearamide in place of zinc stearate as a flash drier coating reduces the agglomeration during prefoaming and that the adhesion of the principal coating to the beads is improved.

TABLE 3

| | Example | | | | Comparative Example | | | |
|---|---|---|---|---|---|---|---|---|
| Fraction | Before blowing out | After blowing out | Loss (abs.) | Loss (rel.) | Before blowing out | After blowing out | Loss (abs.) | Loss (rel.) |
| 1 | 0.51 | 0.45 | 0.06 | 11.8% | 0.52 | 0.42 | 0.1 | 19.2% |
| 2 | 0.50 | 0.46 | 0.04 | 8.0% | 0.51 | 0.43 | 0.08 | 15.7% |
| 3 | 0.36 | 0.33 | 0.03 | 8.3% | 0.35 | 0.3 | 0.05 | 14.3% |
| 4 | 0.34 | 0.325 | 0.015 | 4.4% | 0.33 | 0.3 | 0.03 | 9.1% |

We claim:
1. A process for the preparation of screen fractions of bead-form, expandable styrene polymers prepared by suspension polymerization, which comprises intimately mixing the beads, which are still moist at the surface, with from 0.02 to 0.25% by weight, based on the dry styrene polymer, of a coating composition comprising ($c_1$) a bisamide made from $C_2$–$C_8$-alkylenediamine and an aliphatic $C_6$–$C_{20}$-carboxylic acid and ($c_2$) an antistatic agent selected from the group consisting of N,N-bis(2-hydroxyethyl)-$C_{12}$–$C_{16}$-alkyamines, fatty acid diethanolamides, chlorine ester chlorides of fatty acids, $C_{12}$–$C_{20}$-alkyl sulfonates, and ammmonium salts in a ($c_1$):($c_2$) weight ratio of from 1 to 50, subsequently removing the surface water by flash drying at a temperature of from 30° to 65° C. for from 1 to 10 seconds, then separating the dry, coated beads into screen fractions.

2. A process as defined in claim 1 wherein ($c_1$) is N,N'-bisethylenestearamide and ($c_2$) is a $C_{14}$–$C_7$-alkyl sulfonate.

3. A process as defined in claim 2, wherein component ($c_1$) of the coating composition comprises more than 80% by weight of particles whose diameter is less than 0.07 mm.

4. A process as defined in claim 3, wherein component ($c_1$) of the coating composition comprises more than 90% by weight of particles whose diameter is less than 0.04 mm.

5. A process as defined in claim 1, wherein additional quantities of the coating composition are subsequently applied to the screen fractions of bead-form expandable styrene polymers.

* * * * *

UNITED STATES PATENT AND TRADEMARK OFFICE
CERTIFICATE OF CORRECTION

PATENT NO. : 5,286,756
DATED : February 15, 1994
INVENTOR(S) : WALTER et al.

It is certified that error appears in the above-indentified patent and that said Letters Patent is hereby corrected as shown below:

Claim 1, column 8, line 47, "$-C_{12}-C_{16}-$" should be -- $-C_{12}-C_{18}-$ --.

Claim 1, column 8, line 48, "chlorine" should be --choline--.

Claim 2, line 55, column 8, "$C_{14}-C_7$-alkyl" should be --$C_{14}-C_{17}$-alkyl--.

Signed and Sealed this

Sixth Day of September, 1994

Attest:

BRUCE LEHMAN

Attesting Officer

Commissioner of Patents and Trademarks